(12) United States Patent
Moorer et al.

(10) Patent No.: US 8,686,890 B2
(45) Date of Patent: Apr. 1, 2014

(54) CUSTOMIZABLE REMOTE CONTROL DEVICE

(75) Inventors: Seale Moorer, Westerville, OH (US); William K. Virgin, Westerville, OH (US); Timothy McMahon, Westerville, OH (US)

(73) Assignee: Exceptional Innovation, LLC, Westerville, OH (US)

( * ) Notice: Subject to any disclaimer, the term of this patent is extended or adjusted under 35 U.S.C. 154(b) by 1709 days.

(21) Appl. No.: 12/127,550

(22) Filed: May 27, 2008

(65) Prior Publication Data

US 2009/0027252 A1 Jan. 29, 2009

Related U.S. Application Data

(60) Provisional application No. 60/940,373, filed on May 25, 2007.

(51) Int. Cl.
- *G08C 19/12* (2006.01)
- *H04L 17/02* (2006.01)
- *H04N 5/44* (2011.01)
- *G06F 15/16* (2006.01)
- *G06F 15/173* (2006.01)

(52) U.S. Cl.
USPC ............ 341/176; 341/173; 348/734; 709/223

(58) Field of Classification Search
USPC .............. 341/20–35, 173–192; 348/725, 734; 709/208, 223, 227, 246, 230
See application file for complete search history.

(56) References Cited

U.S. PATENT DOCUMENTS

| | | | |
|---|---|---|---|
| 5,729,222 A * | 3/1998 | Iggulden et al. | 341/31 |
| 6,182,094 B1 * | 1/2001 | Humpleman et al. | 715/234 |
| 6,278,676 B1 | 8/2001 | Anderson et al. | |
| 6,792,323 B2 * | 9/2004 | Krzyzanowski et al. | 700/90 |
| 6,919,817 B2 * | 7/2005 | Choi et al. | 340/12.51 |
| 7,154,428 B2 * | 12/2006 | de Clercq et al. | 341/175 |
| 7,170,422 B2 | 1/2007 | Nelson et al. | |
| 7,203,486 B2 | 4/2007 | Patel | |
| 7,345,592 B2 * | 3/2008 | Rogers | 340/4.41 |
| 7,380,250 B2 | 5/2008 | Schechter et al. | |
| 7,586,398 B2 * | 9/2009 | Huang et al. | 340/10.5 |
| 2003/0101304 A1 | 5/2003 | King et al. | |
| 2004/0004810 A1 | 1/2004 | Kim | |
| 2004/0218963 A1 * | 11/2004 | Van Diepen et al. | 400/472 |
| 2004/0267876 A1 | 12/2004 | Kakivaya et al. | |
| 2005/0113021 A1 | 5/2005 | Gosieski, Jr. et al. | |
| 2005/0198188 A1 | 9/2005 | Hickman | |

(Continued)

FOREIGN PATENT DOCUMENTS

WO    WO 2007042713 A1 *  4/2007    .................... 719/316

*Primary Examiner* — Hai Phan
*Assistant Examiner* — Franklin Balseca
(74) *Attorney, Agent, or Firm* — Baker & Hostetler LLP

(57) ABSTRACT

A remote controller for controlling a remote unit includes a stationary button assigned to a first function of the remote unit, and a first flexible button assigned to a second function of the remote unit and configured to be addable to or removable from the remote controller. The remote controller may further include a base, a membrane layer mountable on the base, the membrane layer including the stationary button and a first flexible button base, a first flexible button cap mountable on the first flexible button base to form the first flexible button, and a first face mountable on the membrane layer and having a first opening pattern exposing the stationary button and the first flexible button.

20 Claims, 10 Drawing Sheets

(56) References Cited

U.S. PATENT DOCUMENTS

| | | |
|---|---|---|
| 2005/0198304 A1 | 9/2005 | Oliver et al. |
| 2005/0232583 A1 | 10/2005 | Kubota |
| 2005/0262227 A1 | 11/2005 | Heller et al. |
| 2006/0053234 A1 | 3/2006 | Kumar et al. |
| 2006/0106933 A1 | 5/2006 | Huang et al. |
| 2006/0155802 A1 | 7/2006 | He et al. |
| 2007/0053376 A1 | 3/2007 | Oshima et al. |
| 2007/0083679 A1 | 4/2007 | Kikuchi |
| 2007/0104332 A1 | 5/2007 | Clemens et al. |
| 2008/0201723 A1* | 8/2008 | Bottaro et al. ............ 719/316 |

* cited by examiner

CUSTOMIZABLE REMOTE CONTROL DEVICE

CROSS REFERENCE TO PRIOR APPLICATIONS

This application claims priority and the benefit thereof from U.S. Provisional Application Ser. No. 60/940,373, filed May 25, 2007, which is hereby incorporated by reference for all purposes as if fully set forth herein.

BACKGROUND OF THE DISCLOSURE

1. Field of the Disclosure

The disclosure is directed to a remote controller, particularly to a customizable remote controller for use in a converged and automated system and a method for customizing thereof.

2. Related Art

Household, academic and/or business spaces typically have more than one audio or video device, such as, e.g., a CD/DVD player, a portable MP3 player, a radio frequency (RF) tuner, a preamplifier, a power amplifier, a speaker, a VCR, a DVR, a computer running a media player, a computer connected to some other source of audio or video media (e.g., Internet radio, satellite radio and the like), etc. Typically, a CD/DVD player from one original equipment manufacturer (OEM) may be provided with its own remote control device and an amplifier device may be provided by an entirely different OEM with its own remote control device. Further, the same space may include a personal computer (PC) having a keyboard and a mouse, and yet another OEM's portable MP3 player with its own control switches. While each audio/video device is doing precisely what it was designed to do, each operates completely independent from the others. As a result, a user ends up going from one keypad or device to another keypad or device, or juggling a series of remote controls in order to control certain of the devices.

Since these audio/video and similar devices are not designed to communicate with each other or their communication is very limited, access to these audio/video devices is limited by their physical locations. For example, it is difficult to play a digital audio file (such as, e.g., an MP3 file, a WMA file, etc.) saved in a PC hard disk drive in one room or area (such as, e.g., a child's bedroom) on speakers that are located in another room or area (such as, e.g., an entertainment room). Thus, in order for a user to enjoy music of his or her choice whenever and wherever he or she desires, each room must be equipped with all of the necessary audio/video equipment and digital audio/video content.

Further, the audio/video devices may not be designed to communicate with other devices (such as, e.g., a television set (TV), ambient lighting, a security system, etc.). Thus, it may be difficult, if not impossible, to converge the audio/video devices for common control for certain occasions. For example, in order to watch a movie, a user must turn on a TV, a DVD player and an audio amplifier by using three different control devices. Then the user must set the TV to receive a video signal from the DVD player, set the audio amplifier to receive an audio signal from the DVD player and use another control device to adjust the lighting of the room. Finally, the user must find and load a DVD into the DVD player that he or she desires to watch. Even with a universal remote, the user may need to go through almost the same amount of trouble because the universal remote allows the user to control only one device at a time.

These audio/video devices do not converge as described above because the audio/video devices lack any ability to easily connect and effectively communicate with each other, much less allow for control by a single control device. Even if a single control device was available that could handle all of the functions of the individual audio/video devices and additional functions of controlling the audio/video devices in a converged and automated manner, such a control device would be undesirably large and complicated for a user; and some of the buttons may be rarely or never used in certain circumstances.

Accordingly, there is a need for a flexible and versatile control device for controlling various functions and operations of a group of devices in a converged and automated manner.

SUMMARY OF THE DISCLOSURE

In one aspect of the disclosure, a convergence and automation system includes a network implemented with a Web Service for Device (WSD) protocol for enabling interoperable device to device interaction, a plurality of devices connectable to the network and configured to perform a plurality of functions, each device configured to perform at least one of the plurality of functions, a host connectable to the network and configured to converge and automate at least one group of the plurality of functions, and a controller being customizable to control at least one of the plurality of functions and the at least one converged and automated group of functions.

The plurality of devices may include at least one of an audio device, a video device, an intercom system, an ambient lighting system, a security system or a HVAC system.

The convergence and automation system may further include at least one client connectable to the network, the at least one client being configured to control at least one of the plurality of functions.

The at least one client may include a television, a personal computer, a personal digital assistant, a gaming device, a remote controller, or a telephone. The controller may be configured to control the at least one client.

The controller may include at least one addable or removable flexible button. The controller may further include at least one stationary button arranged at a predetermined location on the controller. The controller may be programmable to assign a desired function to the at least one addable or removable flexible button. The controller may include a universal remote controller.

In another aspect of the disclosure, a remote controller for controlling a remote unit includes a stationary button assigned to a first function of the remote unit, and a first flexible button assigned to a second function of the remote unit and configured to be addable to or removable from the remote controller.

The remote controller may further include a base, a membrane layer mountable on the base, the membrane layer including the stationary button and a first flexible button base, a first flexible button cap mountable on the first flexible button base to form the first flexible button, and a first face mountable on the membrane layer and having a first opening pattern exposing the stationary button and the first flexible button.

The first flexible button cap may include at least one of a text and a symbol representing the first function of the remote unit.

The base may include a power supply configured to provide power to the membrane layer, and a communication unit configured to establish communication between the remote controller and the remote unit.

The membrane layer may further include a second flexible button base, wherein the remote controller may further include a second flexible cap mountable on the second flexible button base to form a second flexible button. The first face may be replaceable with a second face having a second opening exposing the stationary button and the second flexible button.

The remote controller may further include a trim ring arrangeable between the first face and the membrane layer. The trim ring may include a plurality of openings arranged to correspond to the at least one stationary button and the first flexible button. The trim ring may include chrome-plating.

The remote controller may further include a backlight configured to illuminate at least one of the stationary button and the first flexible button. The membrane layer may include the backlight.

The remote controller may be programmable to add, change or delete the second function assigned to the first flexible button.

In yet another aspect of the disclosure, a method of customizing a remote controller configured to control a remote unit, the remote controller comprising a plurality of buttons, includes removing a first face from the remote controller, the first face having a first opening pattern covering a first button base, mounting a first button cap on the first button base to form a first button, and attaching a second face to the remote controller, the second face having a second opening pattern exposing the first button.

The method may further include removing a second button from the remote controller, the second button including a second button base and a second button cap. The removing the second button may include removing the second button cap from the second button base, wherein first opening pattern of the first face exposes the second button and the second opening pattern of the second face covers the second button cap.

The method may further include assigning a first function of the remote unit to the first button. The method may further include removing a second function of the remote unit assigned to the second button.

Additional features of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show details of the disclosure in more detail than may be necessary for a fundamental understanding of the disclosure and the various ways in which it may be practiced. In the drawings.

DETAILED DESCRIPTION OF THE DISCLOSURE

Figure 1:
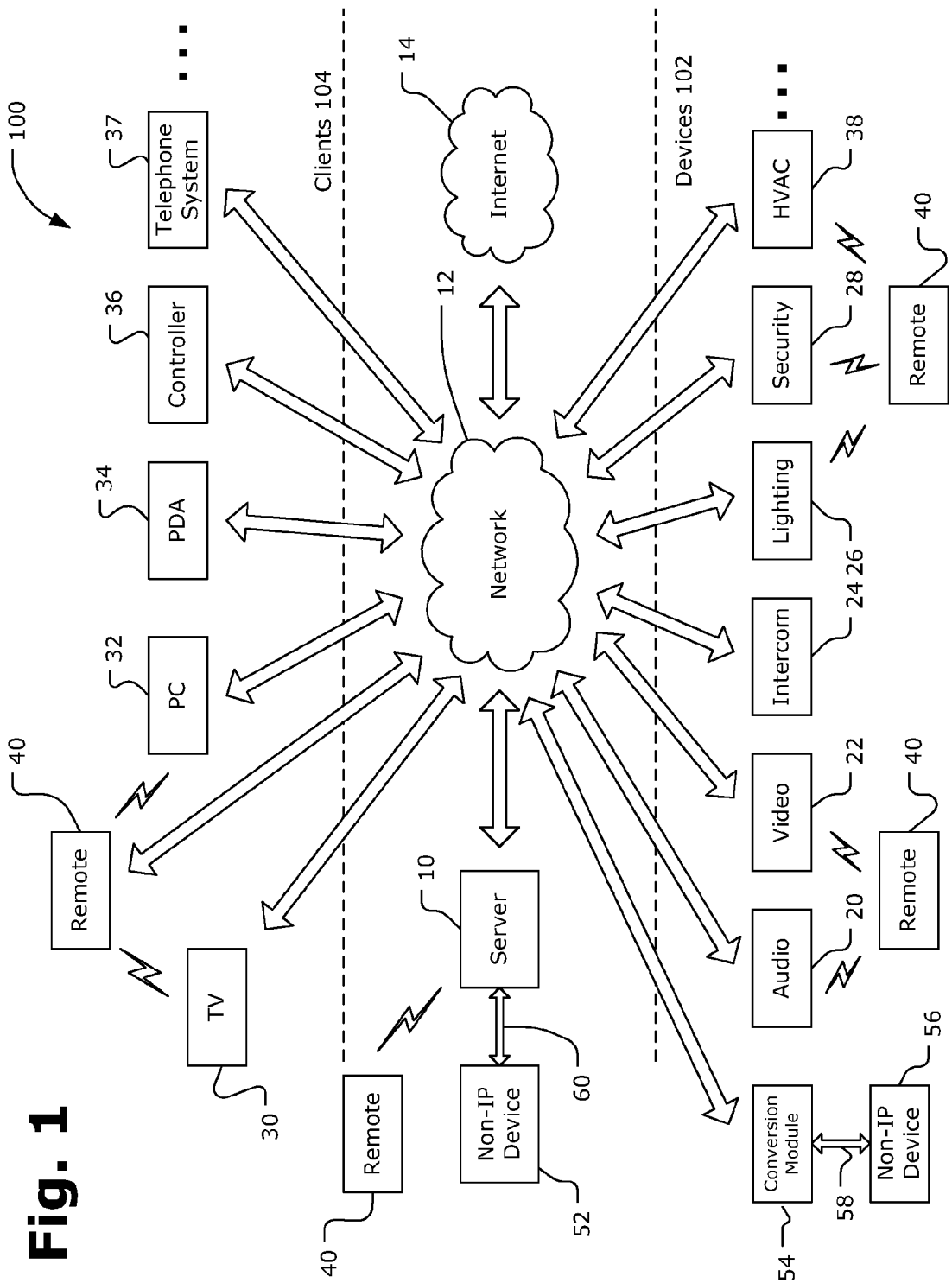
FIG. 1 shows a conceptual overview of a convergence and automation solution (CAS) constructed according to an embodiment of the disclosure.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

FIG. 1 shows a conceptual overview of a convergence and automation solution (CAS) 100 constructed in accordance with an embodiment of the disclosure. The CAS 100 may be a combination of hardware and/or software. The hardware may include a server 10, a plurality of devices 102, a plurality of clients 104 and/or the like. The server 10, the devices 102 and the clients 104 may be connected to a network 12, which may be an Internet protocol (IP) based wired and/or wireless network, such as, e.g., a personal area network (PAN), a local area network (LAN), a campus area network (CAN), a metropolitan area network (MAN), a wide area network (WAN) and/or the like. The network 12 may be connected to the Internet 14.

The server 10 may be any type of computer connectable to the network 12, including, but not limited to, for example, a personal computer (PC), a workstation, a mainframe computer or the like, as the skilled artisan will readily appreciate, without departing from the scope or spirit of the disclosure. The devices 102 may include any type of electronic devices configured to perform one or more functions, including, but not limited to, for example, an audio device 20, a video device 22, an intercom system 24, an ambient lighting system 26, a security system 28, a heating, ventilating and air conditioning (HVAC) system 38, and/or the like.

The clients 104 may be configured to provide a user with control over one or more of the devices 102 and/or other clients 104. The clients 104 may include, but are not limited to, for example, a TV 30, a PC 32, a personal digital assistant (PDA) 34, a controller 36, a telephone system 37 and/or the like. The controller 36 may include, but is not limited to, for example, a control panel, a gaming console (e.g., X-Box™, Playstation Portable™ and/or the like), and/or the like. Some of the clients 104 may be configured to perform one or more functions. For example, the user may use the TV 30 to watch TV programs or DVD movies, or to view a control menu when controlling the devices 102.

The clients 104 may further include one or more remote controllers 40 to control the devices 102 and/or the clients 104; or the remote controller 40 may be configured to be a client 104. The user may use the remote controller 40 to listen to music, watch and/or record video, enjoy family photographs and home movies, as well as adjust the lighting, secure the home, adjust the ambient temperature, distribute music throughout the house, check surveillance cameras and the like.

In an embodiment, the CAS 100 may be configured to interact with other devices that are not equipped with an IP-based communication interface, such as, for example, a window shade automation device, a light control device, an audio device, a video device and/or the like. For example, the CAS 100 may be configured to interact with non-IP devices 52, 56 (shown in FIG. 1) using non-IP based communication channels 60, 58, respectively. The non-IP based communication channels 60, 58 may include, but are not limited to, for example, a serial port, a parallel port, a USB port, a COM port, a telephone line, a power line and/or the like.

The non-IP device 52, located proximate to the server 10, may be directly connected to the server 10 via the non-IP based communication channel 60. For the non-IP device 56, which may be located further away from the server 10, a link or conversion module 54 may be connected to the non-IP device 56 via the non-IP based communication channel 58 to connect the non-IP device 56 to the network 12. For example, the conversion module 54 may provide the non-IP device 56 with an Ethernet connection to enable IP based communications with the network 12. The conversion module 54 may provide more than one non-IP based communication connection, depending on, e.g., a particular application, as the skilled artisan will readily appreciate. For example, the conversion module 54 may include one or more of a serial port, a parallel port, a USB port, a COM port, a telephone line, a power line and the like. Accordingly, the non-IP device 56 may communicate with the server 10, the devices 102 and/or the clients 104 via network 12 and operate as one of the devices 102.

The software (e.g., application) may enable the hardware such as the server 10, the devices 102 and the clients 104 to communicate with each other despite different proprietary languages and/or communication protocols that may be used by each of the server 10, the devices 102 or the clients 104. Thus, the user may be provided with control over most or all of the hardware, including the server 10, the devices 102, and the clients 104 in the CAS 100 from the clients 104. The application may operate the CAS 10 such that the server 10, the devices 102 and the clients 104 may communicate with each other to send instructions and receive feedback. For example, the software may integrate centralized device control into a PC-based media environment (such as, e.g., a Microsoft Media Center™ environment) that may store, organize and play digital media content.

The software may be implemented with a Web Service (WS), a platform independent software system designed to support interoperable machine to machine interaction over the network 12. For example, U.S. Patent Publication No. 2007/0225865, titled "DEVICE AUTOMATION USING NETWORKED DEVICE CONTROL HAVING A WEB SERVICE FOR DEVICE STACK," which is incorporated herein by reference in its entirety, discloses a Web Service for Device (WSD) stack for use in the CAS 100 in order to enable the server 10, the clients 104 and the devices 102 running on any platform and written in any computer language to communicate with each other without needing to know how various tasks are accomplished.

In an embodiment, some of the server 10, the devices 102 and the clients 104 may be running Microsoft Windows Vista™ or a similar operating system (OS) implemented with Windows SideShow™ or a similar functionality that enables a computer to drive a variety of auxiliary display devices. The server 10 may communicate with the devices 102 and/or the clients 104 via compatible protocols, such as, for example, but not limited to, the SideShow™ XML communication specifications and/or the like. This may enable the server 10 to display various information of the CAS 100 as a Sideshow Gadget™ or a similar object on the screens of the devices 102 and/or clients 104. Moreover, if the server 10 is running a widget engine, such as, e.g., Windows Sidebar™, Yahoo! Widgets™ and the like, for running and displaying widgets thereon, the server 10 may provide a user interface rendered for monitoring and controlling the devices 102 and/or the clients 104 via the WSD technology.

As shown in FIG. 1, the CAS 100 may include more than one remote controller 40 to fully take advantage of the rather complex and discrete nature of the CAS 100. For example, one remote controller 40 may be required to control the TV set 30 located in one location, e.g., a bedroom, and another remote controller 40 may be required to control the audio device 20, the video device 22 and the light device 26 or the like in a different location, e.g., a living room. Thus, the remote controller 40 intended for use in the living room may include buttons to control the audio device 20, the video device 22 and the light device 26, but the remote controller 40 intended for use in the bedroom may not need the buttons for controlling the audio device 20, the video device 22 and the light device 26 located in the living room. Accordingly, the remote controller 40 intended for use in the living room may be configured differently from the remote controller 40 intended for use in the bedroom.

One approach to address the above example may be to design and manufacture a number of customized remote controllers 40, each configured for use in a certain room or situation. Another approach may be to build the remote controller 40 to include all of the necessary buttons to control all of the functions of the CAS 100, so that the remote controller 40 may be used in any room or situation. Alternatively, the remote controller 40 may be configured to be customizable, as necessary or desired by the user. For example, the remote controller 40 may be configured such that a user may add and/or remove buttons to and/or from the remote controller 40, assign new functions to the added buttons, cancel the functions assigned to the removed buttons, and change the functions assigned to the buttons, as necessary or desired by the user.

Figure 2:
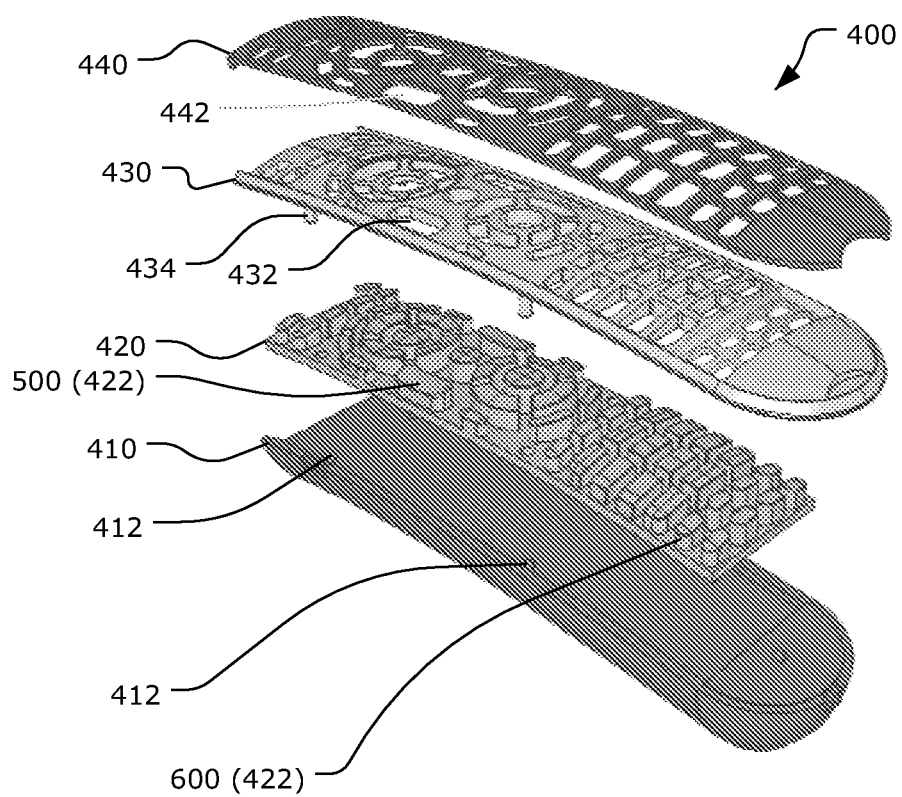
FIG. 2 shows an exploded perspective view of a remote controller constructed according to an embodiment of the disclosure.

FIG. 2 shows an exploded view of a remote controller 400 configured to control a remote unit 16 (shown in FIG. 3), constructed in accordance with an embodiment of the disclosure. The remote controller 400 may be used as, but not limited to, the remote controller 40, shown in FIG. 1. The remote controller 400 may be constructed by assembling various components such as, but not limited to, a base 410, a membrane layer 420, a trim ring 430 and a face 440. The membrane layer 420 may include a plurality of buttons 422 arranged on an upper side thereof and protruding upwardly.

Both the trim ring 430 and the face 440 may have a plurality of openings 432, 442 arranged corresponding to the plurality of buttons 422. The trim ring 430 may be attached to the base 410 to fix the membrane layer 420 therebetween, and the face 440 may be removably attached to the trim ring 430. However, as the skilled artisan will readily recognize, the remote controller 400 may be constructed in different configurations with fewer or more components, without departing from the scope and/or spirit of the disclosure.

The membrane layer 420 may be configured to sense the user's actuation of certain of the buttons 422, e.g., by depression or touching, and generate certain signal(s) or code(s) corresponding to the actuated button(s) 422, as is well known in the art. For example, each of the buttons 422 may be assigned with a unique identification code, which may be transferred to the base 410 when the corresponding button is actuated. The membrane layer 420 may output the identification code(s) via a set of terminals (not shown), which may be connected to another set of terminals (not shown) of the base 410. The two sets of terminals may be configured to form electrical contact when the membrane layer 420 is attached to the base 410, as is well known in the art. The buttons 422 of the membrane layer 420 may include one or more stationary buttons 500 and one or more flexible buttons 600, which are described below with reference to FIGS. 4, 5 and 6.

Figure 3:
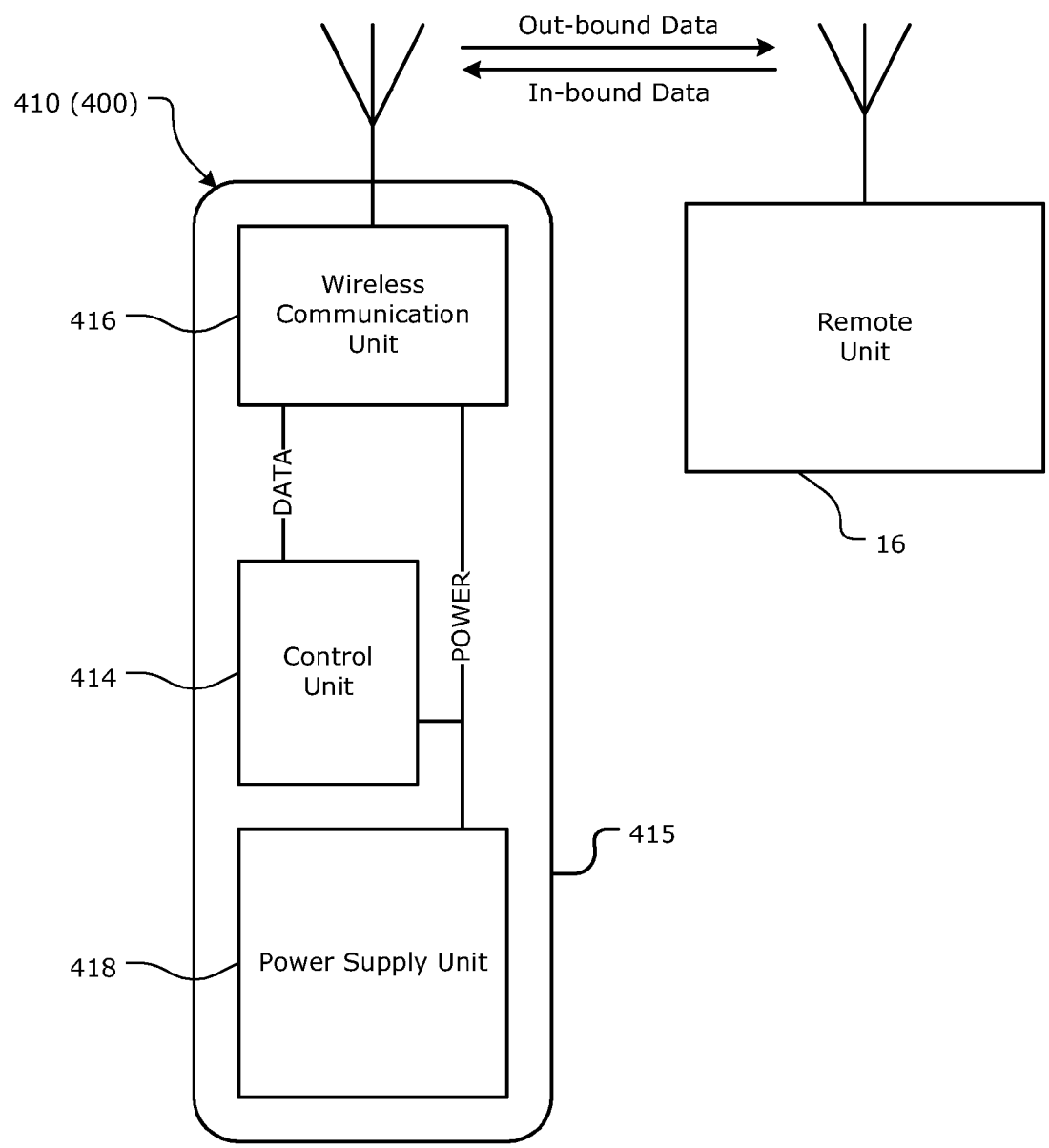
FIG. 3 shows a configuration of a base of the remote controller shown in FIG. 2 and a remote unit, constructed according to an embodiment of the disclosure.

The base 410 may be configured to receive the signal(s) or code(s) from the membrane layer 420 and to transmit the signal(s) or code(s) to the remote unit 16 wirelessly. FIG. 3 shows an example of a configuration of the base 410 constructed in accordance with an embodiment of the disclosure. The base 410 may be configured with, but not limited to, a control unit 414, a wireless communication unit 416, a power supply unit 418 and a housing 415. However, as the skilled artisan will readily recognize, the base 410 may be constructed in different configurations with fewer or more components, without departing from the scope and/or spirit of the disclosure. The housing 415 may be configured to engage the face 440 to fix the membrane layer 420 therebetween. The control unit 414 may be configured to control various operations of the remote controller 400. The power supply unit 418 may be configured to provide power to the control unit 414, wireless communication unit 416 and the membrane layer 420. The power supply unit 418 may include, for example, one or more batteries as is well known in the art.

The wireless communication unit 416 may be configured to communicate with the remote unit 16, which may be one or more of the server 12, a device 102 or a client 104 of the CAS 100 shown in FIG. 1. The communication between the wireless communication unit 416 and the remote unit 16 may be unidirectional (i.e., out-bound data only) or bidirectional (i.e., both in-bound and out-bound data). The wireless communication unit 416 may include a wireless transmitter (not shown) for unidirectional communication or a wireless transceiver (not shown) for bidirectional communication.

The wireless transmitter or transceiver may be a wireless Ethernet (e.g., Wi-Fi 802.11(x)) transmitter or transceiver, a Bluetooth transmitter or transreceiver and the like. For example, the wireless communication unit 416 may include a wireless Ethernet transceiver for exchanging data in a Wi-Fi 802.11(x) compliant data packet format with the remote unit 16. However, as the skilled artisan will readily recognize, the wireless communication unit 416 may include conventional remote control communication devices, such as, e.g., a near infrared (NIR) transmitter or transceiver and/or the like. Further, the wireless transmitter or transceiver may be implemented as a combination of a Bluetooth transmitter or transceiver, a wireless Ethernet transmitter or transceiver, a NIR transmitter or transceiver or the like, without departing from the scope and/or spirit of the disclosure.

The out-bound data may include the identification code(s), which may be generated from the membrane layer 420. The remote unit 16 may include a modifiable look-up table (not shown) listing the functions corresponding to the identification codes. Upon receiving the identification code(s) from the remote controller 400, the remote unit 16 may refer to the look-up table to identify the function corresponding to the received identification code(s) and execute the function(s) identified from the received identification code(s). If the user chooses to add, delete or change function(s) assigned to identification code(s), the user may simply modify the look-up table in the remote unit 16. For example, when the remote controller 400 is used as the remote controller 40 in FIG. 1, the look-up table may be stored in the server 10, and the user may use any of the server 10, the devices 102 or the clients 104 to modify the look-up table by taking advantage of the WSD technology implemented in the CAS 100. Upon receiving the identification code(s) from the remote controller 400, the server 10 may instruct the devices 102 and/or the clients 104 to execute the function(s) corresponding to the received identification code(s). Alternatively or additionally, the devices 102 and/or the clients 104 may be configured to receive the identification code(s) directly from the remote controller 40 and execute the corresponding function(s) without involving the server 10.

The out-bound data may further include system information data, such as, e.g., remote controller identification data, remote controller location data, remote controller battery status data, and the like. When the remote controller 400 is used as the remote controller 40 in FIG. 1, the system information data included in the out-bound data may be displayed as a widget on the server 10, the devices 102 and/or the clients 104 by taking advantage of the WSD technology implemented in the CAS 100. For example, the server 10 running a widget engine may display a widget showing the location and battery status of the remote controller 400 on any of the server 10, the devices 102 and/or the clients 104.

Further, the remote controller 400 may be configured to receive the in-bound data from the remote unit 16. The remote controller 400 may be equipped with a display (not shown), such e.g., an LCD screen or the like. The remote controller 400 may be configured such that the information included in the in-bound data may be displayed on the display. Particularly, when the remote controller 400 is used as the remote controller 40 in FIG. 1, the remote controller 400 may receive information from the server 12 and display the information on the display by taking advantage of the WSD technology and Windows SideShow™ or a similar functionality implemented in the CAS 100. For example, when the server 10 receives a security alert notification from the security system 28 (shown in FIG. 1), the server 10 may display a security alert message on the display of the remote controller 400. Alternatively or additionally, the remote controller 400 may be equipped with an audio device, such as, e.g., a speaker or the like, to generate an alerting sound upon receiving the security alert message from the server 10.

In an embodiment, the user may use the remote unit 16 to customize the remote controller 400. For example, when the remote controller 400 is used as the remote controller 40 in FIG. 1, the user may use the server 10 to customize the remote controller 400 by taking advantage of the WSD technology implemented in the CAS 100. The user may assign functions to the buttons 422, change or delete the functions assigned to the buttons 422 and/or the like using the server 10. The server 10 may send customization instructions to the remote controller 40, which may be received by the wireless communication unit 416 and executed by the control unit 414. The user may also be able to customize the remote controller 40 using the devices 102 and/or the clients 104.

Figure 4:
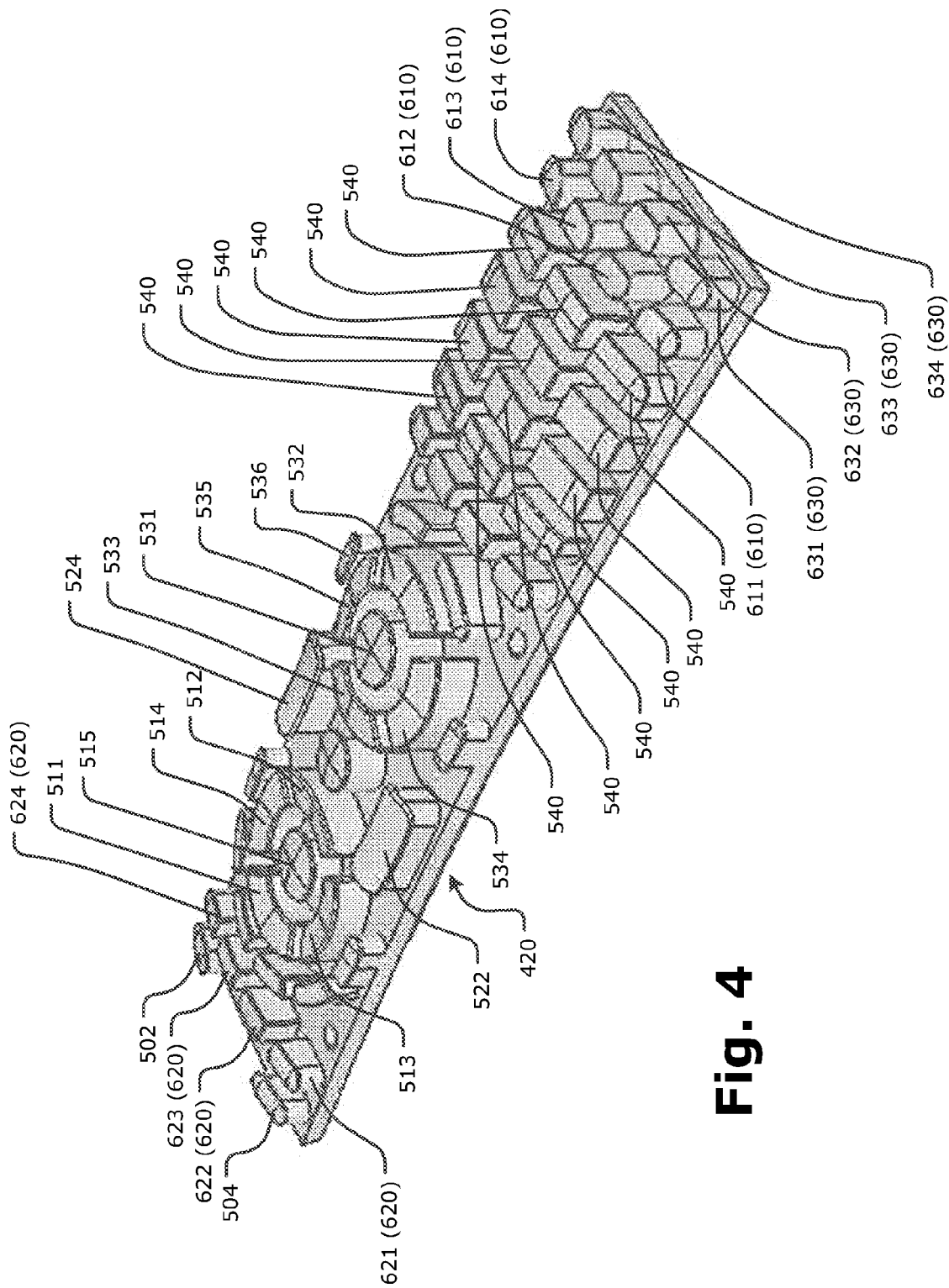
FIG. 4 shows an enlarged perspective view of a membrane layer of the remote controller shown in FIG. 2, constructed according to an embodiment of the disclosure.

FIG. 4 shows an enlarged perspective view of the membrane layer 420 shown in FIG. 2. The buttons 422 of the membrane layer 420 may include one or more stationary buttons 500 and one or more flexible buttons 600. The stationary buttons 500 may be assigned to functions that may be found in more than one remote unit 16. For example, the stationary buttons 500 may include one or more of the following: a power button 502, an eject button 504, a volume control button 522, a channel control button 524, a plurality of navigation buttons (e.g., an up button 511, a down button 512, a left button 513, a right button 514, a selection button 515 and the like), a plurality of device control buttons (e.g., a play button 531, a stop button 532, a pause button 533, a rewind button 534, a fast forward button 535, a mute button 536 and the like, a plurality of numeric buttons 540 and/or the like.

When the remote unit 400 is used as the remote unit 40 of the CAS 100 shown in FIG. 1, the power button 502 may be used to turn on or off all of the devices 102 and/or the clients 104 in an area within communication with the remote controller 40. Further, the device control buttons 531, 532, 533, 534, 535, 536 may be used to control functions of the audio devices 20, the video devices 22, or the clients 104. The stationary buttons 500 may be included in all of the different remote controllers 40 in the CAS 100.

The flexible buttons 600 may be used to control functions that may be unique to a situation. For example, in the CAS 100 shown in FIG. 1, an entertainment room may include a group of the devices 102, e.g., a projection TV, a Blu-ray™ DVD player, a 7.1 surround system, a digital light dimmer system and/or the like. By taking advantage of the WSD technology implemented in the CAS 100, certain functions of the group of the devices 102 in the entertainment room may be converged and automated and may be assigned to one or more flexible buttons 600 of the remote controller 40 intended for use in the entertainment room. For example, the remote controller 400 intended for use in the entertainment room may include a flexible button 600 having, e.g., a label "Cinema" and assigned to activate converged and automated functions for an optimum movie watching experience, such as, e.g., turning on the projection TV, the Blu-ray™ DVD player, the 7.1 surround system, adjusting an ambient light setting of the digital light dimmer system, and/or the like. However, the same "Cinema" button may not be necessary to a different remote controller 400 intended for use in, e.g., a bedroom, where the converged and automated functions for the optimum movie watching experience may not be necessary.

Accordingly, the remote controller 400 may be configured such that the flexible buttons 600 may be added to and/or removed from the remote controller 400 depending on the situation. The user may assign any single function of the remote unit 16 and/or any number of converged and automated functions of one or more remote units 16 to the flexible buttons 600. Also, the user may change the previously assigned function and/or add a secondary function to both the stationary buttons 500 and the flexible buttons 600. For example, the user may configure the remote controller 400 such that the volume control button 522 is assigned to a room temperature adjusting function when the remote controller 400 is in a HVAC control mode.

FIG. 4 particularly show the membrane layer 420 including a plurality of flexible buttons 600, such as, a first flexible button group 610 including flexible buttons 611, 612, 613, 614, a second flexible button group 620 including flexible buttons 621, 622, 623, 624, and a third flexible button group 630 including flexible buttons 631, 632, 633, 634. However, as the skilled artisan will readily recognize, the number, shapes, configurations and locations of the flexible buttons 600 are not limited to the particular embodiment shown in FIG. 6, and a different number of flexible buttons 600 in different shapes and/or configurations may be arranged on different locations of the membrane layer 420, without departing from the scope and/or spirit of the disclosure.

Referring to FIG. 2, the trim ring 430 may be attached to the base 410 to fix the membrane layer 420 therebetween. For example, the base 410 may include a plurality of engagement holes 412, and the trim ring 430 may include a plurality of engagement legs 434 arranged corresponding to the plurality of engagement holes 412. By inserting the plurality of engagement legs 434 into their respective engagement holes 412, the trim ring 430 may be attached to the base 410. However, as the skilled artisan will readily recognize, the base 410 and the trim ring 430 may attached to each other using different engagement configurations, without departing from the scope and/or spirit of the disclosure. As mentioned above, the trim ring 430 may include a plurality of openings 432 arranged corresponding to the buttons 442 of the membrane layer 420. Both the stationary buttons 500 and the flexible buttons 600 may protrude though the openings 432 of the trim ring 430.

Figure 7A:
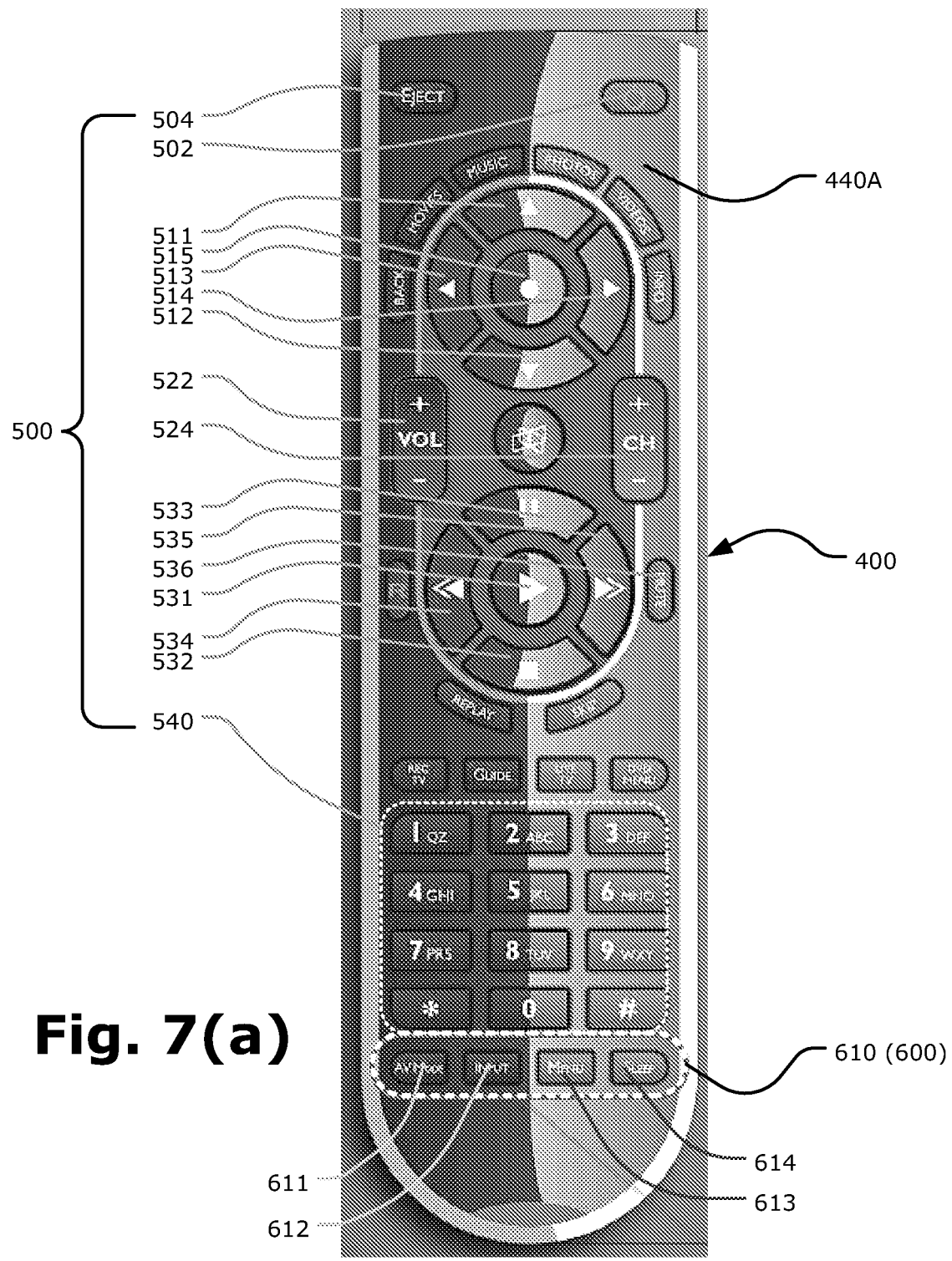
FIGS. 7(a), 7(b) and 7(c) show the remote controller of FIG. 2 having different face and button configurations, respectively, constructed according to an embodiment of the disclosure.

The face 440 may also include a plurality of openings 442 arranged corresponding to the buttons 422 including the stationary buttons 500 and the flexible buttons 600. The face 440 may be configured to selectively expose only the desired buttons. For example, the face 440 may have an opening pattern customized for a particular situation. To use the remote controller 400 in a different situation, the user may simply replace the face 440 with another face having a different opening pattern. For example, when a new device is added or introduced for use in a room for which the remote controller 400 is configured, the user may simply replace the face 440 to another face with an appropriate opening pattern, thereby exposing a desired set of the buttons 422. The opening pattern of the face 440 may expose all of the stationary buttons 500 and a selected number of the flexible buttons 600. For example, FIG. 7(a) shows the face 440 configured to expose the stationary buttons 500 and only the flexible buttons 611, 612, 613, 614 of the first flexible button group 610.

To facilitate easy replacement, the face 440 may be configured to detachably engage the trim ring 430. For example, the face 440 may be snapped into a recess formed on the main surface of the trim ring 430 such that the user can remove the face 440 from the trim ring 430 using a simple tool (such as, e.g., screw driver). The face 440 may be formed of molded plastic, rubber or the like, which may be manufactured at a relatively low cost.

Figure 5:
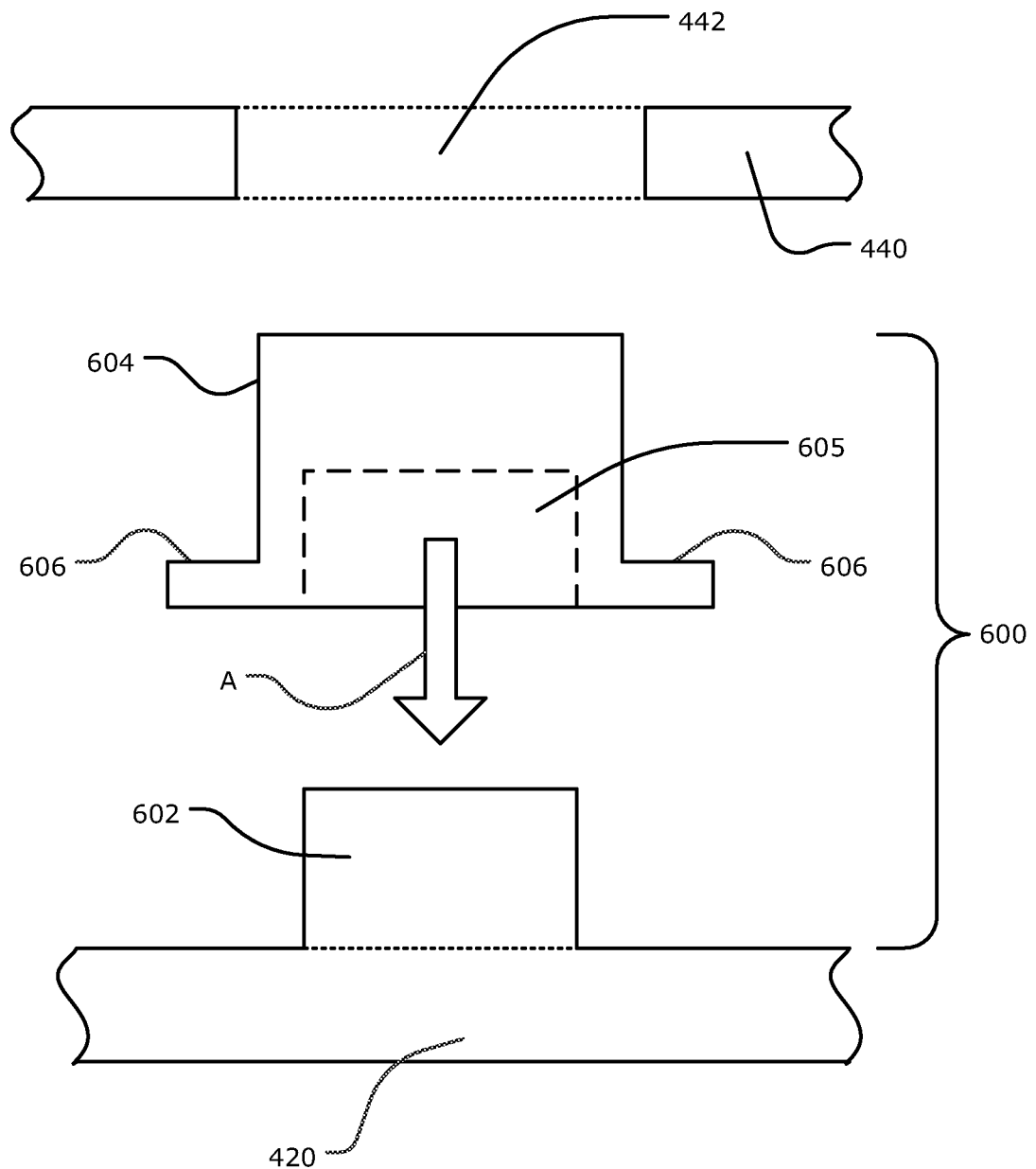
FIG. 5 shows a side view of a button cap and a button base of a flexible button, constructed according to an embodiment of the disclosure.

FIG. 5 shows a side view of a configuration of a flexible button 600 in accordance with an embodiment of the disclosure. The flexible button 600 may be configured by combining a button base 602 and a button cap 604. The button base 602 may protrude upwardly from the membrane layer 420. The button cap 604 may be mounted on the button base 602 to form the flexible button 600. The button cap 604 may have a recess 605 formed at the bottom thereof to engage the button base 602 by pushing down the button cap 604 toward the button base 602 in a direction shown by an arrow A. The button base 602 may be configured to be short enough not to reach a lower surface of the face 440 when in a fully assembled configuration. The mating of the button base 602 and button caps 604 may be absolute such that the button cap 604 may not be removed from the button base 602 without a specialized top cap removal tool (not shown). This may ensure that the remote controller 400 does not pose a health and/or safety risk for adults or children. However, as the skilled artisan will readily recognize, the flexible button 600 may be configured with different configurations, without departing from the scope and/or spirit of the disclosure.

The button cap 604 may be mounted on only the desired button base 602. Upon mounting the button cap 604 on the desired button base 602, the flexible button 600 may protrude through the opening 442 of the face 440. The button cap 604 may have a rim 606 around the bottom side thereof. The circumference of the rim 606 may be larger than that of the opening 442 of the face 440 in order to prevent the button cap 604 from escaping from the button base 602 through the opening 442. This combinational configuration may be used for the flexible buttons 600 for customizing the remote controller 400. However, the stationary buttons 500 may be also similarly configured if necessary or desired.

Figure 6:
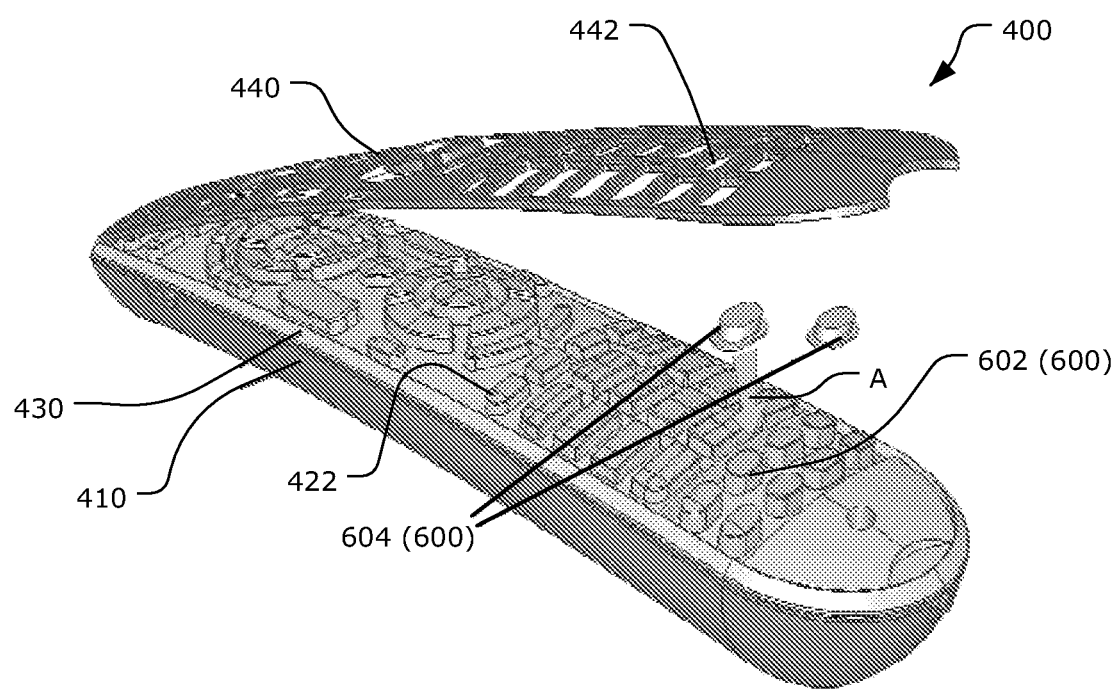
FIG. 6 shows another exploded perspective view of the remote controller shown in FIG. 2.

FIG. 6 shows another exploded perspective view of a remote controller shown in FIG. 2. As described above, the button cap 604 may be mounted on the button base 602 by pushing down the button cap 604 toward a corresponding button base 602 in the direction shown by the arrow A. Once the button cap 604 is mounted on the desired button bases 602, the face 440 may be attached to the trim ring 430. As mentioned above, the face 440 may have an opening pattern that matches one or more button caps 604 mounted on corresponding one or more button bases 602. Further, the membrane layer 420 may be configured to provide for the backlighting of the button caps 604 in order to provide the same backlighting of every button on the remote. In this regard, the button caps 604 may be at least partially transparent or translucent to allow light from the backlight to be seen by the user. Alternatively, the button caps 604 may include a luminescent material, which may absorb and store light energy.

By adding and/or removing the button caps 604, the remote controller 400 may be easily modified when there is a need or desire for reconfiguration of the buttons 422 or functions associated therewith. A user may reconfigure the remote controller 400 by detaching the face 440 from the trim ring 430, adding or removing button caps 604 and attaching a (new) face 440 with a matching opening pattern to the trim ring 430. Further, the WSD technology may provide the user with complete control over programming of each button 422, which enables the remote controller 400 to function as a universal remote. Accordingly, the remote controller 400 may be modified depending on particular needs, circumstances or preferences, as the skilled artisans will recognize, thereby providing a flexible and versatile control device for handling various functions and operations of a group of devices in a converged and automated manner.

Figure 7B:
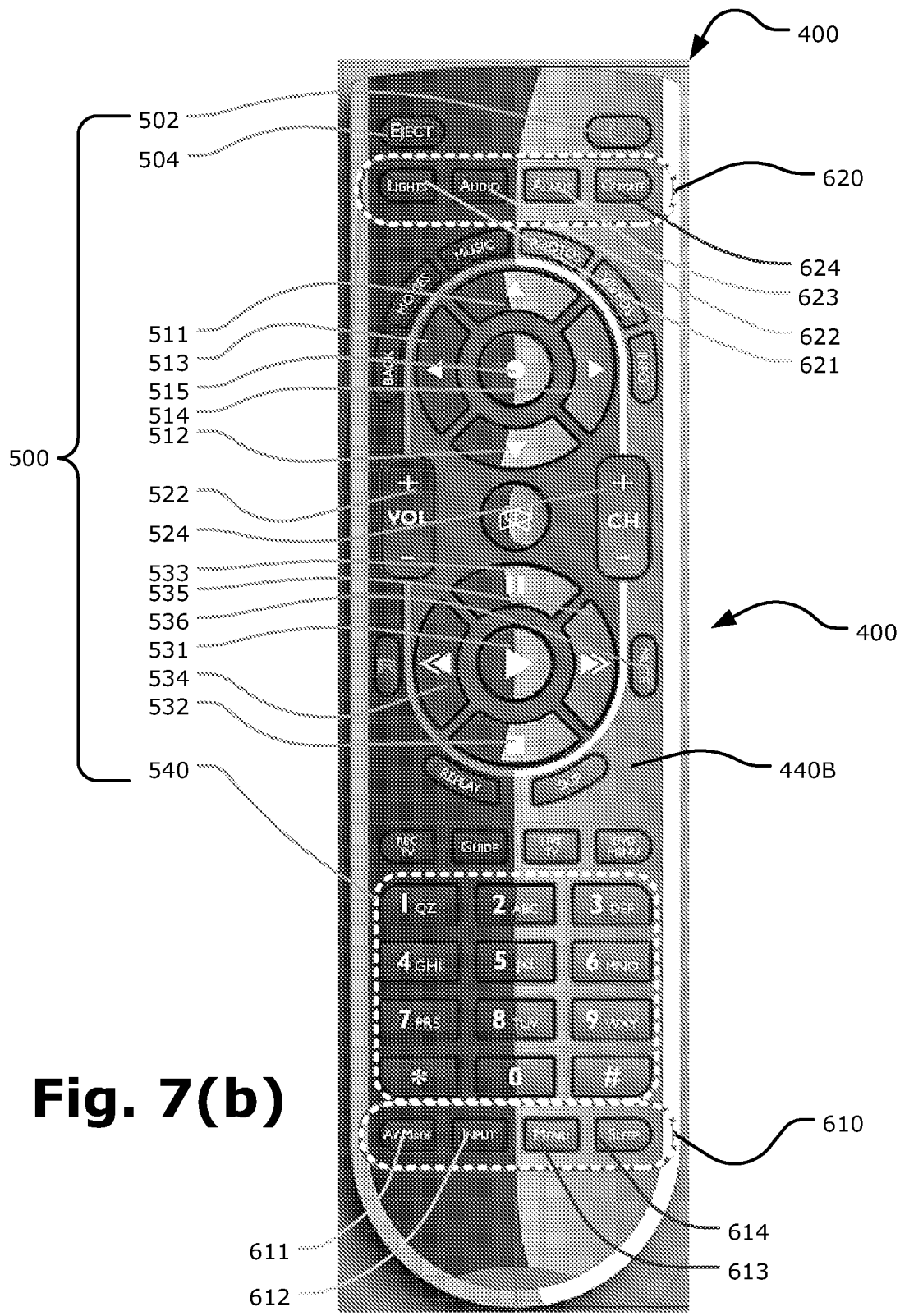
Figure 7C:
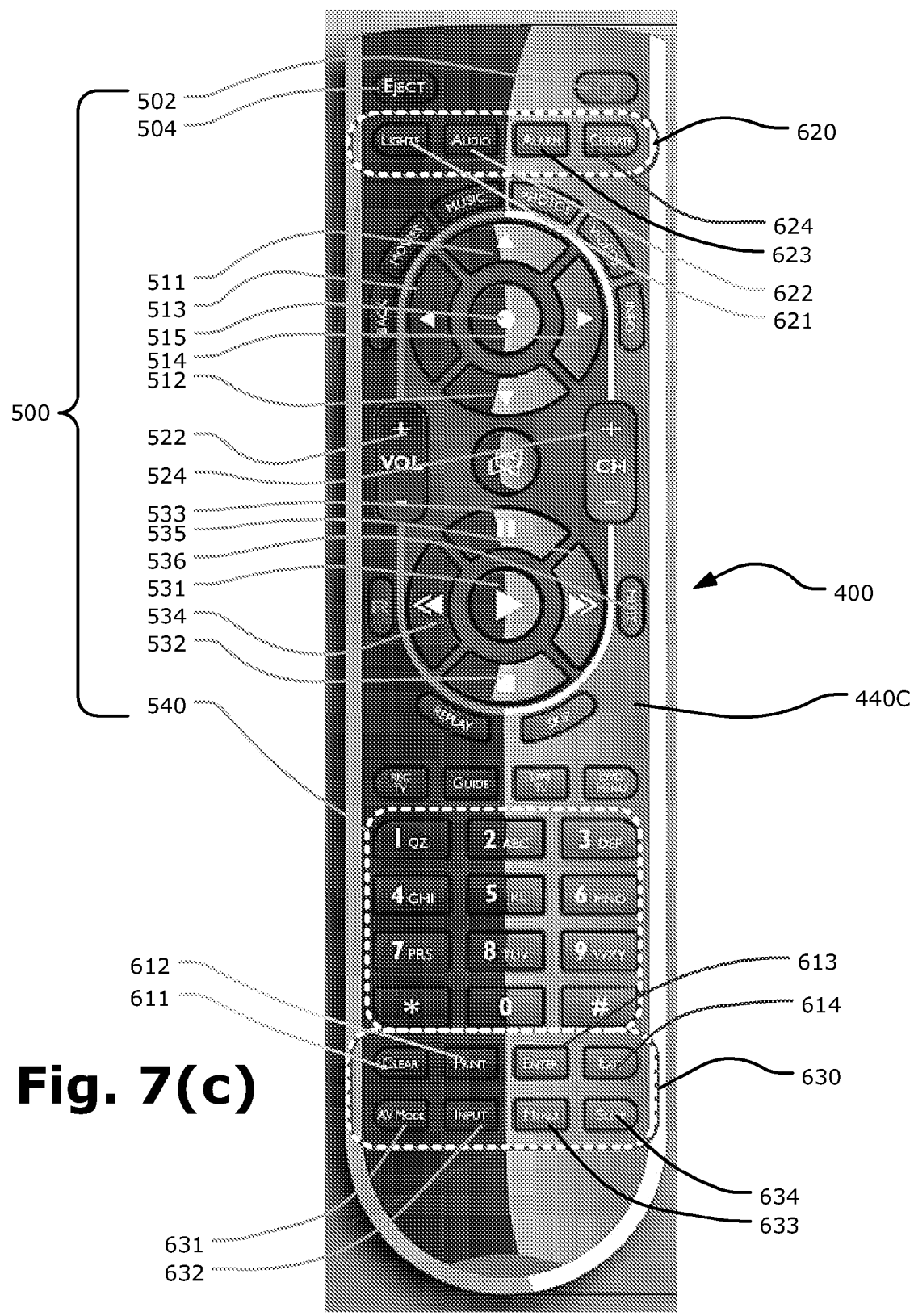

FIGS. 7(*a*), 7(*b*) and 7(*c*) show various examples of the remote controller 400 with different faces 440A, 440B, 440C, respectively, attached thereon. As described above with reference to FIG. 6, the buttons 442 of the remote controller 400 may include the stationary buttons 500 and the flexible buttons 600. The remote controller 400 shown in FIGS. 7(*a*), 7(*b*) and 7(*c*) may have the same number of stationary buttons 500 arranged on the same locations on the different faces 440A, 440B, 440C. For example, the stationary buttons 500 may include the power button 502, the eject button 504, a plurality of the navigation buttons (e.g., the up button 511, the down button 512, the left button 513, the right button 514, the selection button 515 and the like), the volume control button 522, the channel control button 524, a plurality of the device control buttons (e.g., the play button 531, the stop button 532, the pause button 533, the rewind button 534, the fast forward button 535, the mute button 536 and the like, a plurality of the numeric buttons 540 and/or the like.

While the number and locations of the stationary buttons 500 may be the same on the faces 440A, 440B, 440C, the number and locations of the flexible buttons 600 may be different from each other. Thus, the faces 440A, 440B, 440C may have different opening patterns depending on the number and locations of the flexible buttons 600. For example, in FIG. 7(*a*), the face 440A may include an opening pattern corresponding to the first flexible button group 610, which includes the flexible buttons 611, 612, 613, 614 arranged in a single row and assigned to an "AV Mode" function, an "Input" function, a "Menu" function and a "Sleep" function buttons, respectively. FIG. 7(*b*) shows the face 440B having a different opening pattern from the face 440A, to expose the first flexible button group 610 and a second flexible button group 620 including the flexible buttons 621, 622, 623, 624 arranged in a single row and assigned to a "Lights" function, an "Audio" function, an "Alarm" function and a "Climate" function, respectively. FIG. 7(*c*) shows the face 440C having an opening pattern different from that of the faces 440A, 440B to expose the second flexible button group 620 and a third flexible button group 630. The third flexible button group 630 may include the flexible buttons 611, 612, 613, 614, 631, 632, 633, 634 arranged in two rows and assigned to a "Clear" function, a "Print" function, an "Enter" function, an "Exit" function, an "AV Mode" function. an "Input" function, a "Menu" function and a "Sleep" function, respectively.

As mentioned above, each of the buttons 422 may be programmed in any imaginable way possible by taking advantage of the WSD technology. Thus, the button caps 604 (shown in FIGS. 5 and 6) may be configured with appropriate pre-printed text such as, for example, "Lights," "Climate," "Temp," "Security," "Alarm," "CCTV," "Camera," "Movie," "DVD," "Print," "Clear" "Exit," "DirecTV," "DISH," "CABLE," "TV" "Stereo," "AVR," "VCR," "TiVo," "Amenities," "Services," "Room Service," "Housekeeping," "HD-DVD," "BLU-Ray," "XM," "Sirius," "Sports," "News," "HBO," "CNN," "ABC," "NBC," "CBS," "FOX," "ESPN," "Weather," "Home," "Away," "Party," "Fire," "Police," "Medical," "Emergency," and the like.

Alternatively, the button caps 604 may use a logo or icon in lieu of text where appropriate due to the size of the button. For example, a logo may include a TV station identifier (such as, e.g., NBC™ or CH 122) or home automation action. The button caps 604 may have the same look and feel as the permanent buttons once they have been mated to the button bases 602 (shown in FIGS. 7 and 8).

Figure 8:
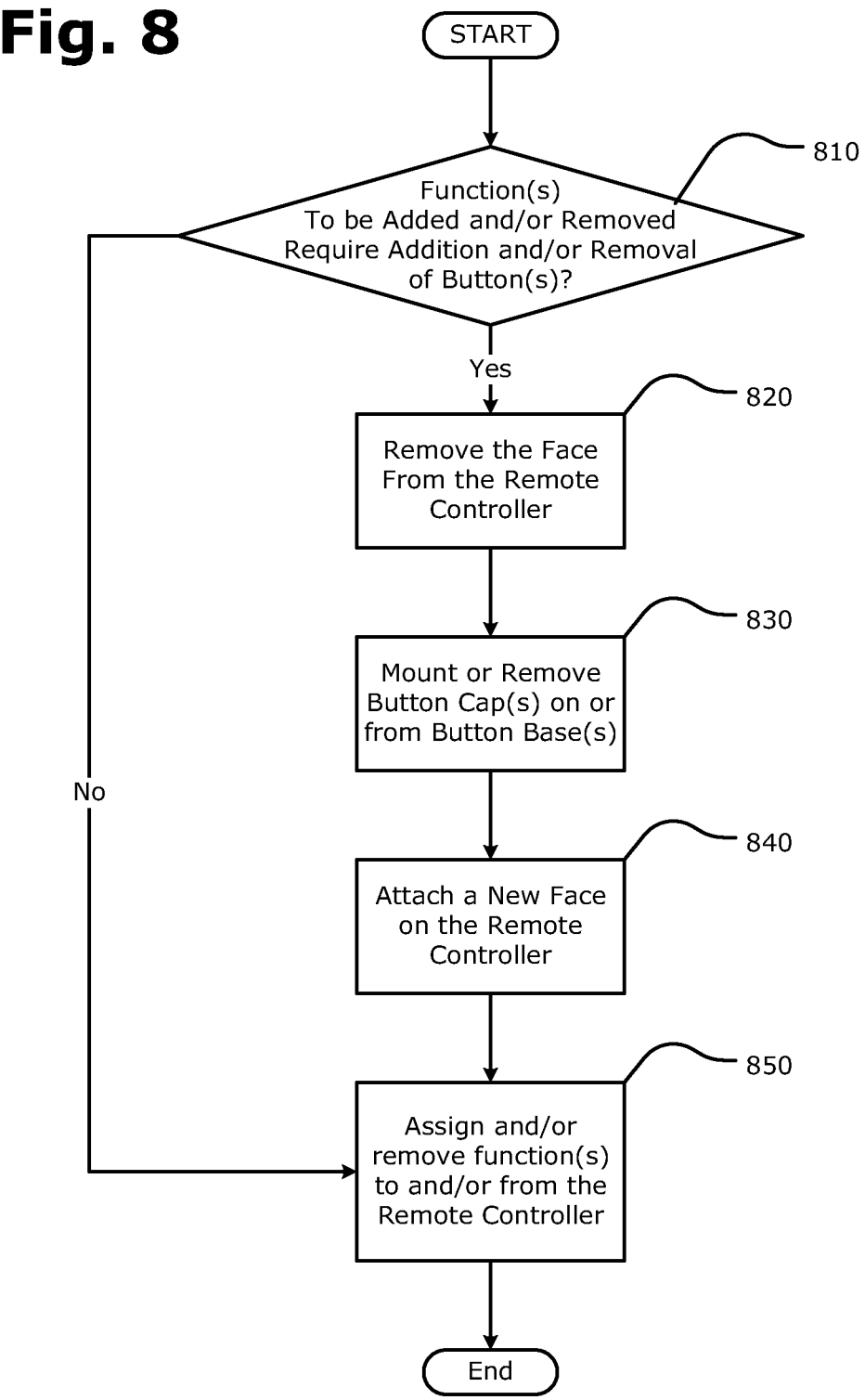
FIG. 8 shows a process for customizing the remote controller shown in FIG. 2 in accordance with an embodiment of the disclosure.

FIG. 8 shows a process for customizing the remote controller 400 in accordance with an embodiment of the disclosure. The process shown in FIG. 8 may be perform when one or more functions are added to and/or removed from the remote controller 400. Upon starting the process, it may be determined whether it is required to add and/or remove one or more buttons 422 to and/or from the remote controller 400 at step 810. For example, a user may want add an "Alarm" function for activating the security system 28 shown in FIG. 1, to the remote controller 400 shown in FIG. 7(*a*). Then, the user may determine whether it is necessary to add a new button 422 for the "Alarm" function to the remote controller 400.

It may not be necessary to add a new button if the remote controller 400 includes one or more buttons 422 that are not assigned to any functions or assigned to functions that may not be necessary and hence may be replaced with a new function desired by the user. Upon determining that the remote controller 400 does not require a new button 422 at step 810, the process may advance to step 850, in which the one or more functions may be added to and/or removed from the controller 400 by programming the remote controller 400. For example, the user may remove an existing function assigned to, e.g., the "Input" button 612 shown in FIG. 7(a) of the remote controller 400 and assign the "Alarm" function to the "Input" button 612 by, e.g., modifying a look-up table (not shown) listing the function corresponding to the identification code of the buttons 612 of the remote controller 400.

When it is necessary to add and/or remove one or more buttons 422 to and/or from the remote controller 400 at step 810, the user may remove the face 440 from the remote controller 400 at step 820. For example, the user may remove the face 440a shown in FIG. 7(a) from the remote controller 400. The removal of the face 440a may expose one or more buttons bases 602 (shown in FIGS. 5 and 6) of the flexible buttons 621, 622, 623, 624 (shown in FIG. 4), which may have been covered by the face 440a shown in FIG. 7(a).

At step 830, the user may mount and/or remove one or more buttons caps 604 on and/or from the button basses 602. For example, the user may mount a button cap 604 labeled "Alarm" on the button base 602 of the flexible button 623 shown in FIG. 7(b). FIG. 7(b) also shows the button caps 604 labeled "Lights," "Audio" and "Climate" mounted on the button bases 602 of the flexible buttons 621, 622, 624, respectively.

Once one or more button caps 604 are mounted on and/or removed from the button bases 602, the user may attach a new face 440 to the remote controller 400 at step 840. The new face 440 may have an open pattern that exposes the newly added button caps 604 and/or covers the button bases 602 from which the button caps 604 are removed. For example, FIG. 7(b) shows the face 440B attached to the remote controller 400 to expose the "Alarm" button cap 604 mounted on the button base 602 of the flexible button 623. FIG. 7(b) further shows the face 440B to expose the buttons caps 604 labeled "Lights," "Audio" and "Climate" mounted on the button bases 602 of the flexible buttons 621, 622, 624, respectively.

After the new face 440 is attached to the remote controller 400, the remote controller 400 may be programmed at step 850 in order to assign a new function to each of the added buttons 422 and/or remove the function assigned to each of the removed buttons 422. For example, as mentioned above, the user may use the remote unit 16 shown in FIG. 3 to modify a look-up table (not shown) listing the functions corresponding to the identification codes of the buttons 422 of the remote controller 400. Upon completing programming of the remote controller 400 at step 850, the process may be terminated.

Accordingly, in accordance with teaching principles of the disclosure, the remote controller 400 may be configured to be customizable as necessary or desired by the user. The remote controller 400 may be configured such that a user may add and/or remove buttons 422 to and/or from the remote controller 400, assign new functions to the added buttons, cancel the functions assigned to the removed buttons, and/or change the functions assigned to the buttons, as necessary or desired by the user. Thus, the remote controller 400 may be useful for handling various functions and operations of a group of devices that are connectable in a converged and automated manner.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A convergence and automation system, comprising:
    a network implemented with a Web Service for Device (WSD) protocol for enabling interoperable device to device interaction;
    a plurality of devices connectable to the network and configured to perform a plurality of functions, each device configured to perform at least one of the plurality of functions;
    a host connectable to the network and configured to converge and automate at least one group of the plurality of functions;
    a remote controller being customizable to control at least one of the plurality of functions and the at least one converged and automated group of functions;
    the remote controller comprising a stationary button assigned to a first function of the plurality of functions; and
    the remote controller further comprising a first flexible button assigned to a second function of the plurality of functions and configured to be addable to or removable from the remote controller,
    wherein the WSD protocol comprises a WSD stack that includes a first communication layer configured to logically interface the host, a second communication layer configured to physically interface at least one of the plurality devices, and a service provider layer comprising one or more components, each component corresponding to a device category, wherein each component comprises one or more Web Services corresponding to at least one of the plurality of devices of the corresponding device category.

2. The convergence and automation system of claim 1, wherein is the plurality of devices comprise at least one of an audio device, a video device, an intercom system, an ambient lighting system, a security system or a HVAC system.

3. The convergence and automation system of claim 1, further comprising at least one client connectable to the network, the at least one client being configured to control at least one of the plurality of functions.

4. The convergence and automation system of claim 3, wherein the at least one client comprises a television, a personal computer, a personal digital assistant, a gaming device, a remote controller, or a telephone.

5. The convergence and automation system of claim 3, wherein the remote controller is configured to control the at least one client.

6. The convergence and automation system of claim 1, wherein the remote controller comprises an additional addable or removable flexible button.

7. The convergence and automation system of claim 6, wherein the remote controller further comprises an additional stationary button arranged at a predetermined location on the controller.

8. The convergence and automation system of claim 6, wherein the remote controller is programmable to assign a desired function to the at least one addable or removable flexible button.

9. The convergence and automation system of claim 1, wherein the remote controller further comprises a base;
    a membrane layer mountable on the base, the membrane layer comprising the stationary button and a first flexible button base;
    a first flexible button cap mountable on the first flexible button base to form the first flexible button; and a first face mountable on the membrane layer and having a first opening pattern exposing the stationary button and the first flexible button.

10. The convergence and automation system of claim 9, wherein the remote controller further comprises a trim ring arrangeable between the first face and the membrane layer.

11. The convergence and automation system of claim 10, wherein the trim ring comprises a plurality of openings arranged to correspond to the at least one stationary button and the first flexible button.

12. The convergence and automation system of claim 10, wherein the trim rings comprises chrome-plating.

13. The convergence and automation system of claim 9, wherein the first flexible button cap includes at least one of a text and a symbol representing the first function of a remote unit.

14. The convergence and automation system of claim 9, wherein the base comprises:
 a power supply configured to provide power to the membrane layer; and
 a communication unit configured to establish communication between the remote controller and a remote unit.

15. The convergence and automation system of claim 9, the membrane layer further comprising a second flexible button base, wherein the remote controller further comprises a second flexible cap mountable on the second flexible button base to form a second flexible button.

16. The convergence and automation system of claim 15, wherein the first face is replaceable with a second face having a second opening exposing the stationary button and the second flexible button.

17. The convergence and automation system of claim 9, wherein the remote controller further comprises a backlight configured to illuminate at least one of the stationary button and the first flexible button.

18. The convergence and automation system of claim 17, wherein the membrane layer comprises the backlight.

19. The convergence and automation system of claim 1, wherein the remote controller is programmable to add, change or delete the second function assigned to the first flexible button.

20. The convergence and automation system of claim 1, further comprising one or more device bridges corresponding to the one or more Web Services, respectively, each device bridge configured to translate communication between the corresponding Web Service and one of the plurality of devices; and a controller configured to communicate with at least one of the plurality of devices of the corresponding device category.

* * * * *